United States Patent

[11] 3,579,911

| [72] | Inventor | Floyd Steinmetz<br>205 W. Timonium Road, Timonium, Md. 21093 |
|---|---|---|
| [21] | Appl. No. | 734,683 |
| [22] | Filed | June 5, 1968 |
| [45] | Patented | May 25, 1971 |

[54] BALL BEARING LAPPING MACHINE
8 Claims, 5 Drawing Figs.

[52] U.S. Cl. .................................................. 51/3,
51/73R
[51] Int. Cl. .................................................... B24b 7/00,
B24b 9/00
[50] Field of Search ......................................... 51/3, 73,
161, 289 (S)

[56] References Cited
UNITED STATES PATENTS

| 3,447,267 | 6/1969 | Kelber | 51/3 |
| 3,348,338 | 10/1967 | Messerschmidt | 51/3 |
| 1,873,647 | 8/1932 | Hoke | 51/73X |

FOREIGN PATENTS

| 291,667 | 5/1916 | Germany | 51/3 |
| 265,821 | 10/1913 | Germany | 51/73 |

*Primary Examiner*—James L. Jones, Jr.
*Attorneys*—J. Wesley Everett and George L. Brehm ABSTRACT: A ball bearing lapping machine having members with relatively rotatable concentric conical portions, one of the conical portions provided with a spiral groove, a ball feed device for depositing the ball bearings to be lapped at the top of the members, the ball bearings, entering the spiral groove and rolled therealong between the members upon rotation of one member with respect to the other, a receptor to receive the ball bearings as they are discharged upon completion of their rolling course through the spiral groove and an elevator for returning the ball bearings from the receptor to the ball feed device for recycling the ball bearings through the machine. A means to supply lapping compound to space between the conical members and the ball bearings therein is also provided.

INVENTOR
FLOYD STEINMETZ

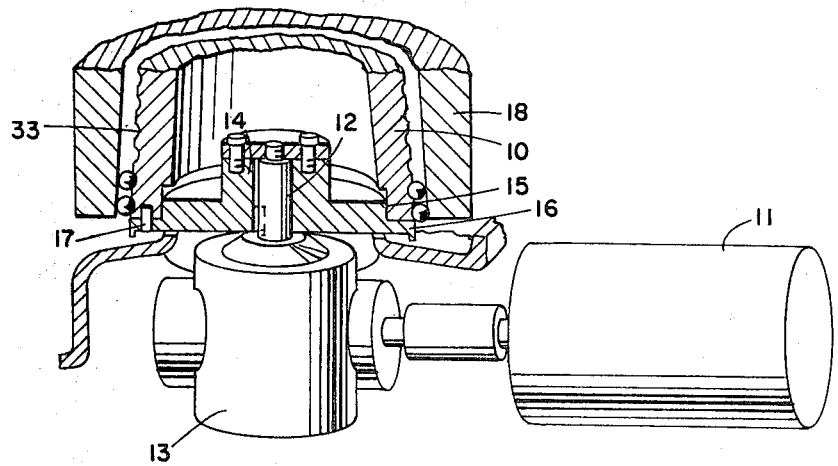
FIG. 2
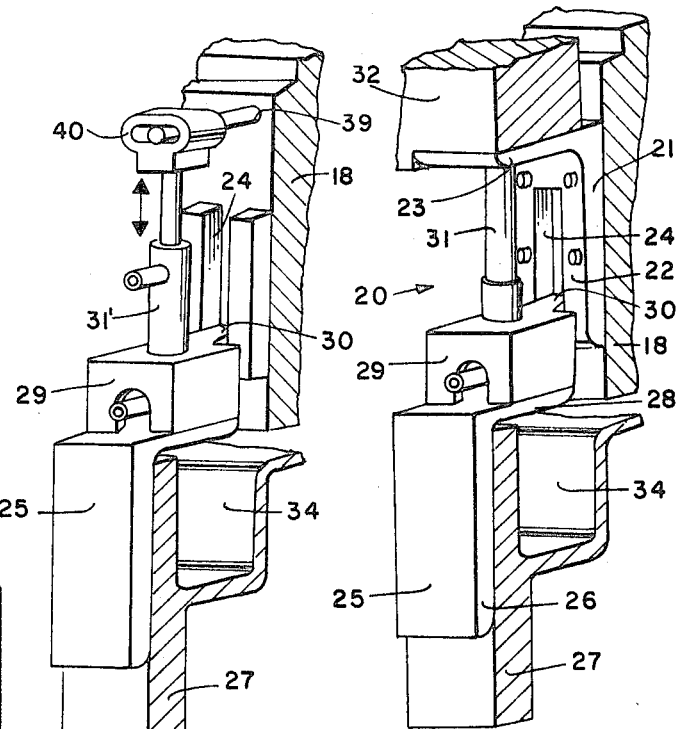
FIG. 4
FIG. 3
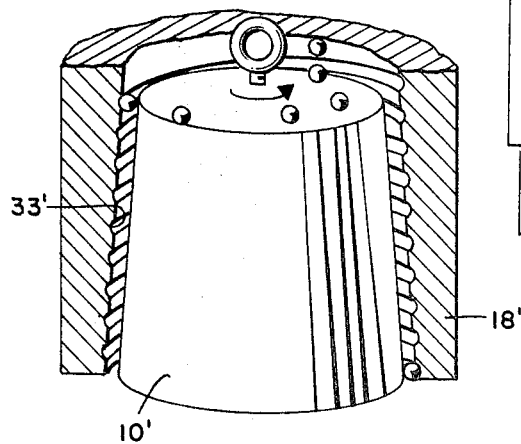
FIG. 5
INVENTOR
FLOYD STEINMETZ

BALL BEARING LAPPING MACHINE

This invention relates to a machine for lapping ball bearings and more specifically to such a machine in which ball bearings are lapped by causing the same to be rolled between two relatively rotatable substantially conical members and in which one of the conical members is provided with one or more spiral grooves of substantially the same diameter and length to form a guide or tack through which the ball bearing must travel and thus be subjected to substantially the same rolling and lapping action.

Lapping machines for ball bearings which subject the bearings to rolling action between surfaces are well known and machines which employ opposed relatively rotatable discs having radial surfaces, one of which is provided with a spiral groove through which the ball bearings rollingly progress have also been employed.

Such prior machines however have been found to have certain disadvantages especially the flat disc type. For example, in manufacture it is difficult to cut a spiral groove in a flat disc as standard lathe gearing favors spiral groove cutting, especially spirals of large leads such as needed in a device of this character on the outside diameter or surface rather than on a radial face. In addition cutting a spiral groove on the face of a large diameter disc is difficult as speed of surface at the point of cutting changes rapidly from inside to outside diameter of the spiral, which cases chatter problems.

Aside from manufacturing difficulties as above stated, the flat disc machine, in order to afford sufficient length of travel for the ball bearings through the spiral groove, requires discs of large size with the consequent size of the entire machine being proportionately large and cumbersome which is a problem where space is at a premium. In addition a large machine means a large expenditure of power for its operation.

It has also been found that as lapping machines normally have safety devices which prevent the relatively rotating surfaces from coming together in case they run out of balls, the problem becomes critical in the flat disc type machine especially when working with small diameter balls as the gap between the lapping surfaces is small.

Applicant has found that by making the relatively rotatable members providing the lapping surfaces conical, the above and many other disadvantages of the disc machine are obviated and a such improved and more efficient machine is produced.

It is evident that conical members are much smaller in diameter than flat discs with the same length of travel for the ball bearings passing through the lapping cycle resulting in a machine which occupies less floor area.

Furthermore, the conical members require a great deal less clamping load on the machine lapping elements to effect proper lapping action than is required by the lapping elements of the flat disc type machine. For example, a 5°45' surface taper on the conical members reduces the required clamping load on the lapping members to substantially one-tenth of that required by the flat disc type machine. This reduction of the clamping load on the lapping elements likewise reduces the load on the machine bearings and obviously tends to lengthen the life of the machine.

It is applicants's object therefore to provide a ball bearing lapping machine having relatively rotatable conical surfaces which offer the advantages above set out. This and other objects will become more apparent as this description proceeds, reference being had to the accompanying drawings forming a part of this specification, in which:

FIG. 2 is a fragmentary perspective, partly sectionalized showing the drive means for the rotatable conical member in more detail;

FIG. 3 is a detail section through the pressure ring and stationary lapping cone showing details of the guide means and the means for releasing the weight pressure on the stationary cone;

FIG 4 is a view similar to FIG. 3 of a modified form of mechanism for applying and releasing pressure on the stationary lapping cone, and FIG. 5 is a view of modified lapping cones in which the outer stationary cone is provided with the spiral groove.

Figure 1:
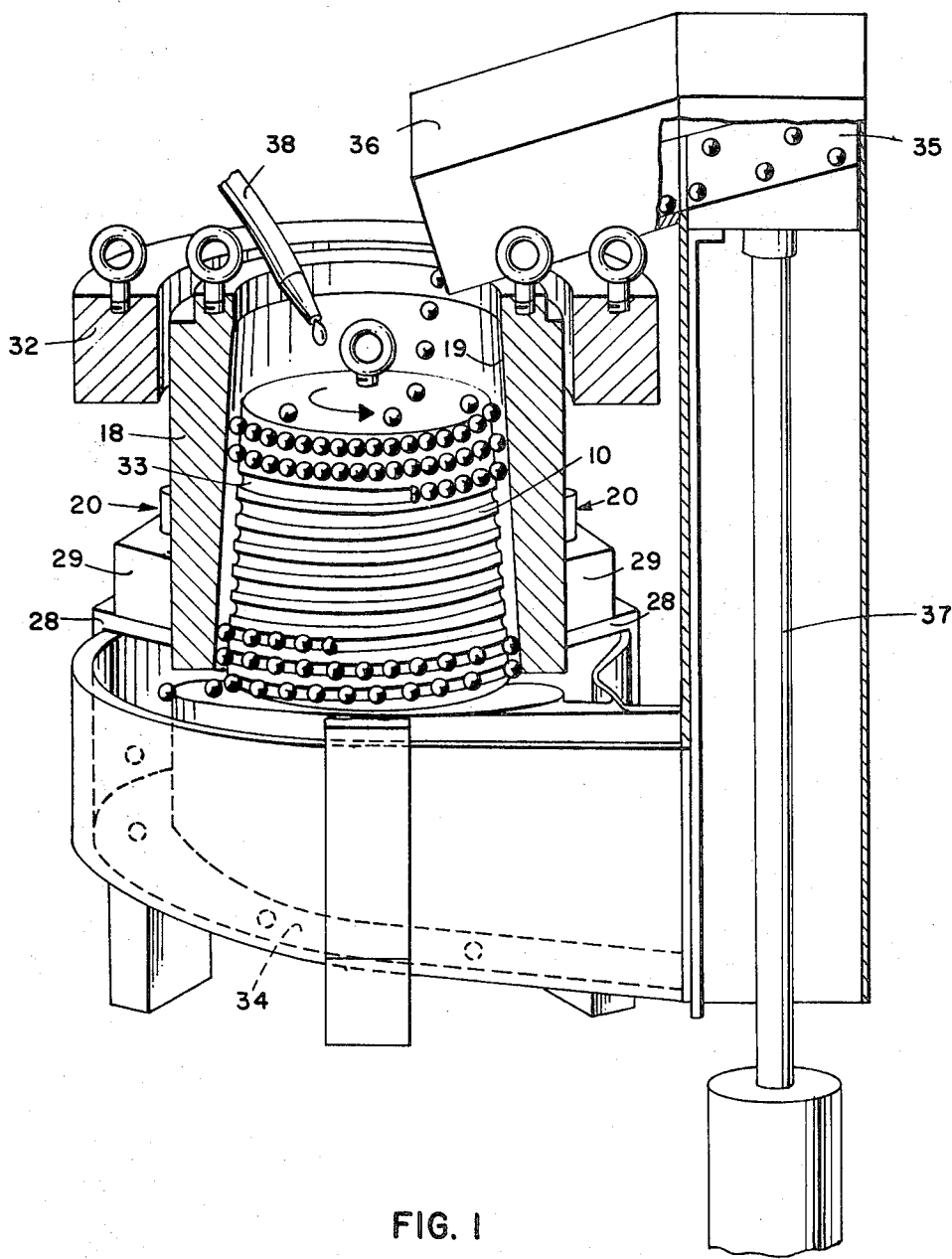
FIG. 1 is a perspective view partly in section of a ball bearing lapping machine showing my new invention.

Referring to the drawings in more detail and especially to FIGS. 1 and 2 thereof, 10 is a member essentially frustoconical in shape mounted for rotation on a central vertical axis. To properly mount and rotate the member 10 a motor 11 drives vertical shaft 12 through a suitable gear box 13. A flange member 14 is fixedly keyed or otherwise secured to shaft 12 and its outer circumference is provided with a substantially cylindrical pilot surface 15 and radial flange 16. The conical member 10 which is hollow, has an inner surface at its larger end snugly fitting the pilot surface 15 and rests on the radial flange 16. A pin or similar key means 17 through the flange 16 and into the end of the conical member 10 effectively locks these two members against relative rotation and insures rotation of the cone 10 by the shaft 12.

An outer ring member 18, having an inner conical surface 19 of the same cone angle as that of conical member 10, surrounds the latter and is held against rotation but is movable axially, thus providing for approach of the inner conical surface 19 toward the outer conical surface of member 10 as the ring member moves vertically downwardly with respect to member 10.

To guide the outer ring member 18 in a purely longitudinal path the latter is provided with suitable guide means. For illustration, the ring is shown as being supported and guided upon three members spaded equally distantly about the circumference thereof and generally indicated by reference numeral 20 as shown in detail in FIG. 3. While the illustration shows three guide members, it is not intended that the invention be limited to this number as under certain circumstances one of the conical members may be supported on a single guide member.

In the illustration, each guide means consists of an angle member 21 with one leg 22 thereof attached to the outer surface of the ring 18 and the other leg 23 projecting outwardly of the ring 18. The leg 22 is slotted to form a guideway 24 extending lengthwise of the ring 18. A second angle member 25 has one leg 26 attached to the supporting frame 27 of the machine and a second leg 28 which extends inwardly toward the ring 18 and is positioned below and parallel to the leg 23 of the first angle member.

A block 29 is attached to the leg 28 and has a tongue 30 which slides in the guideway 24 to confine the movement of ring 18 to pure rectilinear movement.

Mounted partially in the block 29 and extending upwardly therefrom is a fluid cylinder and piston means 31 which acts on the upper surface of the flange 23 and serves to adjust the ring 18 axially relative to the frustoconical member 10 when desired, as hereinafter more fully explained.

In some instances the weight of the ring 18 itself may be sufficient to supply the necessary pressure on the ball bearings as they pass along the grooves. However, if desirable or necessary to increase the pressure on the ball bearings an additional ring 32 is provided. This element 32 acts as a weight on the ring 18 to urge it downwardly as it rests on the flanges 23 of the upper angle members which in turn are attached to the ring 18 as heretofore described.

The rotary frustoconical member 10 is provided with a spiral groove 33 in its outer surface which is open to both the top and bottom surfaces of the frustoconical member 10. This groove is similar to a screw thread but is of relatively high pitch and is arcuate in cross-sectional shape or in other words is round bottomed. More than one spiral groove may be provided under certain circumstances and if employed they would be much in the nature of a multiple thread on the conical member 10.

Below the inner and outer conical members 10 and 18 respectively, and built as part of the supporting frame of the machine, there is provided a spiral trough like structure 34 which forms an inclined passage or runway in which round objects would readily roll to the lowermost portion thereof.

At the upper part of the machine a receptacle 35 with a spout 36 extending over the space above the rotary and stationary conical members is provided which forms a means to contain and feed ball bearings to the conical lapping surfaces.

An elevator means of any convenient design connects the lowermost end of the spiral runway 34 at the lower portion of the machine with the receptacle 35 at the top.

A pipe 38 also extends over the top of the conical elements for introducing lapping material or liquid to the conical lapping surfaces.

In operation, ball bearings to be lapped and finished are introduced into the top of the machine above the rotary conical element 10. As the element 10 rotates the ball bearings are urged by centrifugal force toward the outer circumference of the element 10 and find their way into the groove 33 where they will progress by rolling motion through the entire length of the groove, being in rolling pressure contact with the inner stationary conical surface 19 and the bottom surface of the spiral groove 33. This rolling action of the ball in combination with the lapping compound introduced through pipe 38 will lap and/or polish the balls as required. After the balls have reached the lower end of the spiral groove they will be discharged from between the conical members and will fall to the spiral trough or runway 34 wherein they will roll by gravity to the lowermost portion to be picked up by the elevator 37 and carried up to receptacle 35 and spout 36 to be recycled through the lapping surfaces of the machine.

The outer conical member 18 and the weight member 32 maintains a proper pressure on the balls during the lapping operation. This weight obviously may be varied as desired.

The action of the weight on the outer conical member may be relieved, when desired, by the fluid piston and cylinder elements 31.

In the modification shown in FIG. 4 the necessity of a weight such as element 32 is obviated and in its place a double acting fluid piston and cylinder 31' is employed. This is connected at its upper end directly to the outer conical element 18 by means of a pin 39 extending outwardly from the outer conical element embraced by an eye member 40 on the piston and cylinder means. The double acting piston and cylinder may then be made to pull downwardly to provide pressure on the ball bearings as they progress through the lapping process or push upwardly to release the pressure.

FIG. 5 illustrates modified forms of inner and outer conical members. In these forms the outer conical member 18' is provided with the spiral groove 33' while the inner conical member 10' is smooth. In operation this variation functions in much the same manner as the first form described.

Having thus described preferred forms of my invention, it is not my desire to be specifically limited thereto but rather to include all reasonable modifications and variation as may fairly fall within the spirit of my invention a defined in the appended claims.

I claim:

1. A machine for lapping ball bearings comprising
   a. an outer member having an inner complete conical surface of revolution,
   b. an inner member having an outer complete conical surface of revolution and mounted coaxially within the outer member, one of said members being rotatable with respect to the other, said outer and inner members having their axes positioned in a vertical direction,
   c. one of said members having at least one spiral groove in its complete conical surface of revolution extending around said surface from one end to the other end thereof,
   d. power means for rotating one member with respect to the other,
   e. means to introduce ball bearings to be lapped to the upper ends of the outer and inner members and to the space between the members and into the groove in said one member to be rolled therealong in contact with the groove in one member and the conical surface of the other member by the relative rotation of one of the members with respect to the other, and
   f. means to urge one member axially with respect to the other to thereby vary the space between said conical surfaces and apply pressure to the ball bearings as they roll between the members in said spiral groove.

2. The structure as defined in claim 1 wherein the said one of the members is provided with a plurality of spiral groves of substantially the same length.

3. The structure defined in claim 1 in which the spiral groove is in the conical surface of the inner member.

4. The structure defined in claim 1 in which the spiral groove is in the conical surface of the outer member.

5. The structure defined in claim 1 in which means to urge the one member axially with respect to the other is a weight acting on one member.

6. The structure defined in claim 1 in which the means to urge the one member axially with respect to the other is a fluid pressure means.

7. The structure defined in claim 1 having, in addition, a receptor for the ball bearings as they emerge from one end of the spiral groove and means for returning the ball bearings from the receptor to the means to introduce the same to space between said members to be recycled through the machine.

8. The structure defined in claim 7 in which the receptor is a spirally inclined trough for receiving the ball bearings and the means for returning the ball bearings is an elevator means.